US008656455B1

(12) United States Patent
Bailey et al.

(10) Patent No.: US 8,656,455 B1
(45) Date of Patent: Feb. 18, 2014

(54) MANAGING DATA LOSS PREVENTION POLICIES

(75) Inventors: Daniel V. Bailey, Pepperell, MA (US); John P. Bell, II, Cork (IE); Siddharth Navare, Herndon, VA (US); Vishnu C. Pedasingu, Bangalore (IN); Rishi Pidva, Raj (IN)

(73) Assignee: EMC Corporation, Hopkinton, MA (US)

( * ) Notice: Subject to any disclaimer, the term of this patent is extended or adjusted under 35 U.S.C. 154(b) by 199 days.

(21) Appl. No.: 13/076,619

(22) Filed: Mar. 31, 2011

(51) Int. Cl.
*G06F 17/00* (2006.01)
*H04L 29/06* (2006.01)

(52) U.S. Cl.
USPC ............................................................. 726/1

(58) Field of Classification Search
USPC ............................................................. 726/1
See application file for complete search history.

(56) References Cited

U.S. PATENT DOCUMENTS

| 6,799,052 | B2 * | 9/2004 | Agness et al. ............. 455/456.4 |
| 7,757,937 | B2 * | 7/2010 | Akiba ........................... 235/375 |
| 8,271,642 | B1 * | 9/2012 | Sankararaman et al. ..... 709/224 |
| 8,365,243 | B1 * | 1/2013 | Lu et al. ............................ 726/1 |
| 2007/0173287 | A1 * | 7/2007 | Henson et al. ................. 455/557 |

* cited by examiner

*Primary Examiner* — Dant Shaifer Harriman
(74) *Attorney, Agent, or Firm* — Krishnendu Gupta; Jason A. Reyes

(57) ABSTRACT

A method is used in managing data loss prevention policies. A device having data loss prevention (DLP) logic based on policies is provided. An attempt to perform an action that is prohibited by the DLP logic is performed at the device. An override code to allow performance of the action is determined at the device.

19 Claims, 2 Drawing Sheets

MANAGING DATA LOSS PREVENTION POLICIES

BACKGROUND

There are a variety of systems for authenticating a user to a computer and/or computer network. For example, to log on to a computer, a user typically types in a password.

Other known authentication systems require two factors of identification. One such system is the RSA SECURID system by RSA, The Security Division of EMC Corporation of Hopkinton, Mass. In general, this system requires a user to input an alpha-numeric Personal Identification Number (PIN) and data from a device in form of an authentication token in possession of the user. A server verifies the user PIN and the security data from the token, which is known by the server. The RSA SECURID system is generally described in U.S. Pat. No. 4,720,860 to Weiss, which is incorporated herein by reference.

Typically, an authentication system requires the sharing of some information with an authentication server, where this information is typically not known to other entities, and where this information allows the generation and verification of at least parts of some authentication string. This authentication string commonly also includes, or is a function of, some information that is memorized by the owner of the token and also stored on the server. The authentication maybe interactive, e.g., a challenge-response format, or non-interactive, e.g., no information is sent from the server to the user/token in order to complete the generation of the authentication string. The information that constitutes the authentication attempt may be sent over a potentially insecure communication link, such as a wireless or wired network.

In some access control systems, such as those found in network file servers, identify an accessing entity by a user identifier (user ID) and/or by membership in one or more named groups. The user ID is optionally dependent on an OS executing on (or on behalf of) the accessing entity, and thus a user ID provided by an OS that is trusted is distinguishable from a user ID provided by an OS that is not trusted. Access is explicitly granted and/or denied for resources, such as files, by enumerated "access rights" for users and/or for groups.

Typically, when a user (having a specific user ID, and being a member of one or more named groups) accesses a resource, such as a file, access is granted if the user ID is permitted access to the resource, or if a group to which the user belongs is permitted access to the resource. In some cases, access to a resource is controlled by a permission list for the resource, each element of the permission list including a user ID and/or a group name along with access rights for the user ID and/or group. The access rights allow or deny various types of access, such as read access, write access, delete access, or all access. Rules and/or policies may control how access rights are resolved, including how conflicting access rights are resolved.

An authentication mechanism may enforce additional requirements before access from a client computer (and/or from a user) to a resource is granted. For example, a requirement may be enforced that an agent (e.g. a software program) be installed on the client computer before access to sensitive files is allowed. Requiring installation of an agent may enable enforcement of usage restrictions, such as by disabling access to some or all resources from the client computer and/or from a specific user.

SUMMARY

A method is used in managing data loss prevention policies. A device having data loss prevention (DLP) logic based on policies is provided. An attempt to perform an action that is prohibited by the DLP logic is performed at the device. An override code to allow performance of the action is determined at the device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Described below is a technique that may by used in managing data loss prevention (DLP) policies. In at least one implementation, the technique may be used to help provide one-time passwords for DLP policy exceptions. In particular, in an example implementation of the current technique, an endpoint (EP) product of a DLP software suite is configured to enforce policies (e.g., Payment Card Industry (PCI) policies) that prevent specific types of data from being operated on (e.g., so that PCI data cannot be copied to removable media), and a feature is provided such that an EP user can ask for an override, i.e., for a DLP enterprise manager (EM) operator to release the EP user's computing device ("device") (e.g., personal computer or smart phone) from one or more of these policies, e.g., for a specific period of time. As described further below, the feature is supported in an offline mode, i.e., when the EM has no connectivity to the EP, by use of a one-time password (OTP) capability that is based on tokens small enough to pass over phone or e-mail and that does not require any connectivity between components. In at least one example case, the OTP encodes the type and duration of override. In another example case, a time limit is placed on the validity of the OTP.

In at least the example implementation, the OTP works only once; this be is accomplished by the EM maintaining a record of part of the transaction that is different each time the OTP system is used.

In one or more embodiments, the EP also enforces policies based on one or more sensors attached to the EP user's device. For example, a GPS sensor may be used to suspend the policy only while the device is in a certain location, which may be especially useful when the EP user's device is or includes a smart phone. In such a case, the conditions for an override may be communicated out of band so that only the location is needed to unlock the EP. Also or instead in such a case, the location itself may be encoded into the OTP to achieve a form of two-factor authentication: both the OTP and correct location are required in order to unlock the EP.

Figure 1:
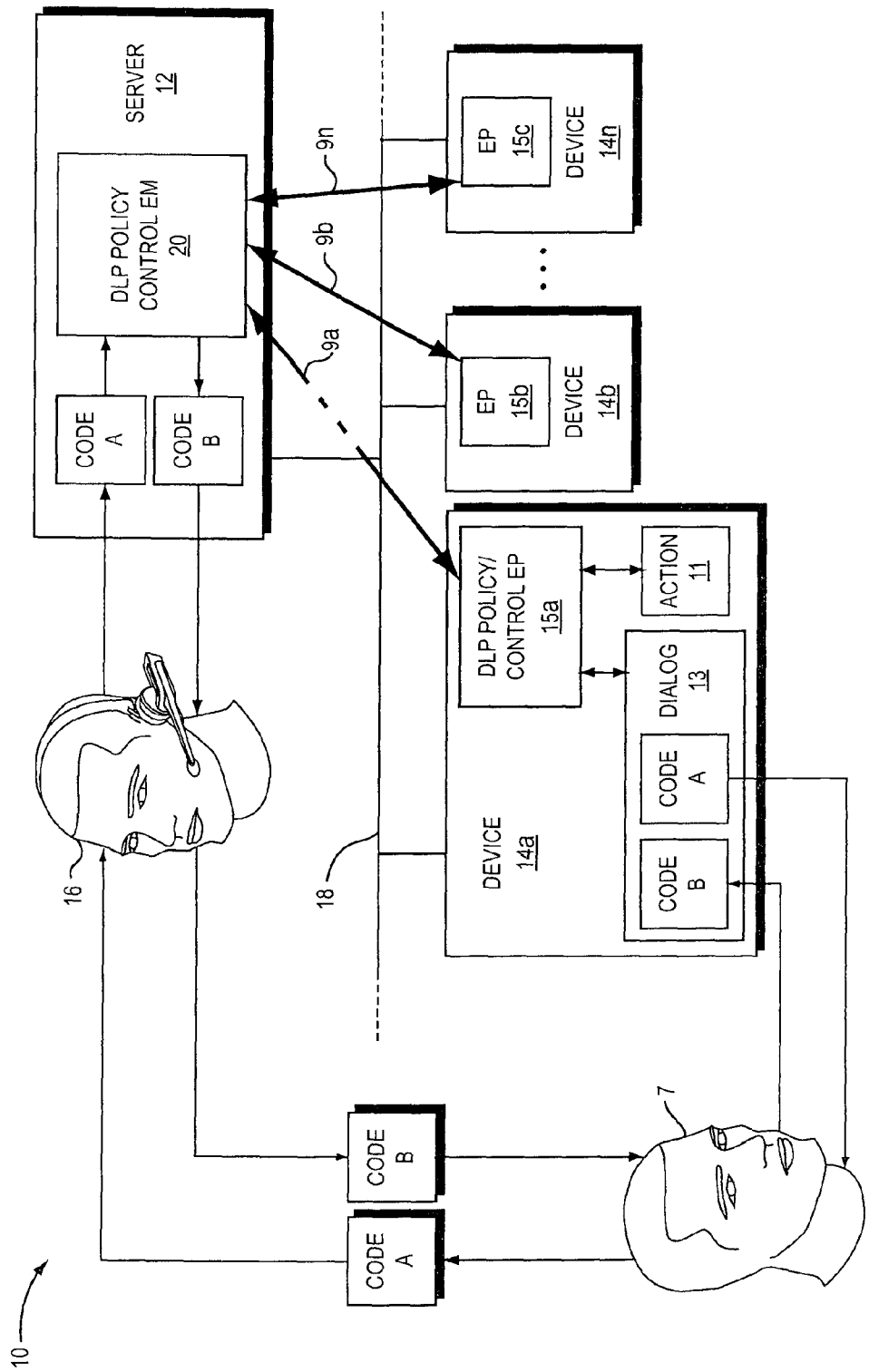
FIG. 1 is an example of an embodiment of a computer system that may utilize the techniques described herein.

Referring to FIG. 1, shown is an example 10 of an embodiment of a computing environment that may be used in connection with performing the techniques described herein, wherein the computing environment helps protect against illicit dissemination of sensitive data. The example involves providing computing devices (e.g., computers or smart phones) 14a-14n having respective DLP policy/control EP logic 15a-15n, and configuring the DLP logic to perform DLP operations. In some arrangements, the EP logic is configured to control and authorize one or more actions 11, e.g., to allow only certain applications to copy sensitive information and/or to block transmission of the sensitive information.

EP logic 15a-15n is constructed and arranged to help prevent unauthorized actions such as transmission of sensitive data from the devices 14a-14n.

As further shown in FIG. 1, DLP policy/control EM logic 20 running on server 12 is constructed and arranged to communicate with devices 14a-14n over a communications medium 18 via communications signals 9a-9n. In at least one implementation, at least a portion of the communications medium 18 is, includes, or is included in a network or network cloud having one or more of a variety of topologies including backbone, hub and spoke, loop, irregular, combinations thereof, and so on. Along these lines, the communications medium 18 may include copper based devices and cabling, fiber optic devices and cabling, wireless devices, combinations thereof, and so on. Moreover, all or some portions of the communications medium 18 may include a computer network (e.g., the Internet, LANs, etc.) and other portions may include a different type of network (e.g., a cellular network, the telephone system, etc.).

One should appreciate that the example environment 10 is well suited for certain types of user activity such as online banking (e.g., device 14a may be a bank server), online shopping (e.g., device 14b may be an online store), cellular phone calls (e.g., device 14n may be a telephone), and downloading user apps (e.g., device 14n may be an app server), among other things. With respect to sensitive data, one should further appreciate that the potential exists for spyware running on one or more of devices 14a-14n to attempt to send the sensitive data to an unauthorized receiving device.

In at least one implementation, during operation of devices 14a-14n, respective EP logic 15a-15n searches the devices 14a-14n for various types of sensitive information such as any data in the format of a credit card number or a social security number, a name and address, a telephone number, location information, other forms of PII, etc. To this end, the EP logic 15a-15n may be preconfigured with particular PII data formats/templates. An example of one PII data format is a credit card number format (e.g., XXXX-XXXX-XXXX-XXXX). Another example of a PII data format is a telephone number format (e.g., XXX-XXX-XXXX), and so on.

Based on policies, EP logic 15a-15n may control which actions 11 may be taken with respect to the sensitive information, e.g., which applications running on respective devices 14a-14n are authorized to send each type of sensitive information. The EP logic 15a-15n performs DLP scanning operations on outgoing data and uses the policies to determine whether to block discovered sensitive data thus protecting against illicit dissemination of the sensitive data.

For such protection, EP logic 15a-15n is primarily concerned with policy monitoring and enforcement of policies related to the sensitive data. For example, a policy may not allow PII or PCI data or Health Insurance Portability and Accountability Act (HIPAA) regulated information to be copied onto a reusable disc or a USB memory stick. In another example, a policy may identify certain keywords in documents as indicating the documents are company confidential and should not be copied.

With respect to enforcement, as described below, EP logic 15a-15n may present a dialog 13 to allow a user to attempt to justify executing action 11. Such justification information may be collected from EP logic 15a-15n as incident reports back to an auditing function, e.g., so an organization can analyze which actions 11 the organization's people are working on.

In some cases, strict enforcement of such policies can interfere with legitimate business or organizational purposes, and a user 7 of a device 14a may need an override. If EP logic 15a can successfully communicate with DLP policy/control EM logic 20 using signals 9a, e.g., because device 14a is connected on a home network with logic 20, user 7 can request an override from logic 20, e.g., by contacting EM operator 16 who is authorized to control logic 20. In response to the request, logic 20 can grant logic 15a the override.

At least sometimes, EP logic 15a may be unable to successfully communicate with DLP policy/control EM logic 20 using signals 9a, i.e., may be out of contact with logic 20, e.g., because device 14a is located remotely or on a restricted network (device 14a may be or include a mobile computing device such as a laptop computer or a smart phone). Absent such successful communication, logic 20 cannot grant logic 15a the override directly.

However, user 7 can still contact operator 16 and operator 16 can still control logic 20, so in accordance with the technique described herein, user 7 may be provided with a way to accomplish the override himself or herself. In accordance with the technique described herein, when device 14a (e.g., laptop) causes logic 15a to be out of contact with logic 20, and user 7 bump ups against policy which user 7 needs to violate for legitimate business or organizational purposes, user 7 is allowed to do so by following a procedure.

An example of the procedure is now described. User 7 is presented with dialog 13 indicating policy violation and presenting an override option, and user 7 contacts, e.g., calls, operator 16. In dialog 13 user 7 selects the override option which displays a code A and presents user 7 with the opportunity to enter a one time password. User 7 contacts operator 16 with the code A, which operator 16 submits to logic 20 to generate a code B in return. Operator 16 returns code B to user 7 who enters code B as the one time password. For example, this exchange between user 7 and operator 16 may take place via telephone or by email. Entry of code B allows logic 15a to causes one or more pertinent policies to be temporarily suspended on device 14a. Code B as the one time password can only be used once on device 14a, and cannot be entered successfully a second time on device 14a, or on another device.

In another usage scenario, in an implementation of example 10 in which logic 20 cannot make a policy change for only a single device because policy changes are managed on a broader scale, at least some aspects of the technique described herein may be used for doing a local change to a policy. For example, user 7 may be a system administrator sitting at a user's laptop 14a who can also leverage this same technique not only to suspend or override a policy but also to make logic 15a accept a new replacement policy, e.g., to debug problems arising because of the policy at the scenario of device 14a.

In at least one implementation, the one time password ("token") (i.e., code B) is not time based but can only be used once because the state that the token is valid for only exists for a short period of time. Specifically, when user 7 attempts action 11 that violates policy, dialog 13 tells user 7 that user 7 is violating policy, and presents an option to take user 7 to a one time password GUI display of dialog 13. If the GUI display is closed before code B is entered, code B no longer works; code B works only on that one presentation of the GUI display. At least on implementation has a time limitation feature built in, which limits how long an override is in effect after the token is entered.

In at least some embodiments, the GUI display that allows entry of the one time password (i.e., code B) presents a different code A each time dialog 13 comes up, based on entropy, which may be a time sensitive condition. Such a one time password may be described as a challenge response one time password. In other embodiments, a time based one time password system such as RSA SECURID may be used as well or instead of the challenge response one time password.

In another implementation, the token is limited to being valid for a period of time so that it is not necessary for the GUI display to remain open the entire time the transaction taking place. For example, in such an implementation, if codes A, B are communicated between user 7 and operator 16 via email, it is unnecessary for the GUI display to be open while user 7 is waiting to receive code B in an email response from operator 16.

In a case in which device 14a is or includes a smart phone or other device having sensors such as a GPS sensor or other location detecting sensor, one or more such sensors may be used so that physical or logical location can be encoded as at least a part of code A and/or code B, with the result that approval of the override depends on the location of device 14a. For example, logic 20 and/or logic 15a may allow the override if device 14a is located within the organization's offices, but may not allow the override if device 14a is located offsite or on a moving vehicle, which may indicate a higher possibility device 14a has been stolen.

Further with respect to a case in which device 14a is or includes a smart phone or other device, the use of smart phones to conduct short-range, contactless, wireless transactions is increasing. For example, Near Field Communication (NFC) or Radiofrequency Identification (RFID) technology enables the wireless exchange of data between devices over a short distance. This technology, for instance, allows for the exchange of credit card information with a merchant terminal by tapping or waving the NFC- or RFID-enabled device within a close proximity to the merchant terminal. The merchant terminal can then read and use the information to perform a commercial transaction.

Using wireless communication technology to exchange sensitive information may present security and privacy concerns. For example, an NFC or RFID device may include several features that may present vulnerabilities, e.g., device 14a may use an external power supply, communicate wirelessly, communicate unknowingly, include persistent state memory that can be modified by a reader during a transaction, and perform computation. These features may be used by attackers to perform tracking, scanning, and man-in-the-middle attacks.

A tracking attack may occur when a potentially legitimate merchant uses a wireless reader to extract data from a device. A scanning attack may be performed by practically anyone at any time, such as in a crowded subway car. In this attack, an unauthorized reader may be used to extract information from a device. A man-in-the-middle attack is possible when a device is able to successfully mimic end-point devices, e.g., a purchaser's device and/or a merchant terminal. Such an attack can result in the purchaser's device and the merchant device exchanging information without knowledge of a clandestine device intercepting and replaying, or relaying, potentially private information.

Countermeasures based on the technique described herein can be taken to help protect against such attacks, to help provide enhanced security for device 14a. In at least one embodiment, the technique may be used to help ensure that device 14a exchanges information with another device only when device 14a has sensor based information that supports a determination by logic 20 and/or logic 15a that such an exchange and override does not involve excessive risk. provides moved in a gesture indicating an intent to do so.

Depending on the implementation, device 14a can be a telecommunications device wirelessly communicating with a merchant terminal, a public-transportation terminal, an access control terminal, an authorization terminal, a telecommunications device, or an identification terminal, which may all exchange information with device 14a to perform a specific operation. For example, a merchant terminal may obtain credit card information from device 14a to process a commercial transaction, or an access control terminal may obtain information from device 14a to determine whether a user and/or device is authorized to access a particular area or resource. The technique described herein may be used to help logic 15a allow device 14a to support such transactions.

Device 14a can take various forms in various embodiments of the current technique. Device 14a can be implemented in packages having a wide variety of shapes and form factors. For example, in some embodiments the device 14a can be, or be incorporated within, a telecommunications device such as a cellular telephone, or a cellular telephone with specialized embedded hardware adapted to interact with the cellular telephone's circuitry, such as a SIM card. In other embodiments, the device 14a can be an RFID-enabled credit-card sized and shaped device, or can be much smaller or much larger. One credit-card sized embodiment of the device 14a includes a microprocessor with on-board memory, a power source, and a small LCD display for display of code A. Embodiments may optionally include a keypad or buttons for PIN entry or entry of code B, entry of authentication information requests, or for other entry or interaction with the device 14a. In another embodiment, a credit-card sized device 14a may include a processor with on-board memory that may be used as a "smart card," that can be installed into another device that provides power and/or an interface. In still other embodiments, device 14a can be a e-passport. Other sizes, shapes, and implementations are possible without departing from the spirit of the invention.

Device 14a may include sensors which are capable of detecting motion of device 14a. In a particular embodiment, device 14a may also include sensor data acquisition logic that may be used to help produce physical context data associated with device 14a. Logic 15a may include physical context data analysis logic to perform analysis of physical context data.

Any number and/or variety of sensors may be used in accordance with the current technique. In some embodiments, sensors may also be integrated with other components internal or external to device 14a.

Other location recognizing sensors may be used in addition to or instead of an GPS sensor. For example, device 14a may include a built-in camera that can be used to help detect location or motion. In an example embodiment, a camera may capture one or more images that can be compared with each other or earlier taken images to determine whether device 14a is near its registered owner. For example, the images may indicate lighting changes or changes in the location of a fixed object. In another example embodiment, device 14a may use a camera for computer vision (e.g., pattern recognition) to help determine whether device 14a is being used in a particular location or for an intended purpose. For instance, a camera may capture images that can be analyzed using pattern recognition to help determine that device 14a is being moved toward a particular wireless terminal.

Figure 2:
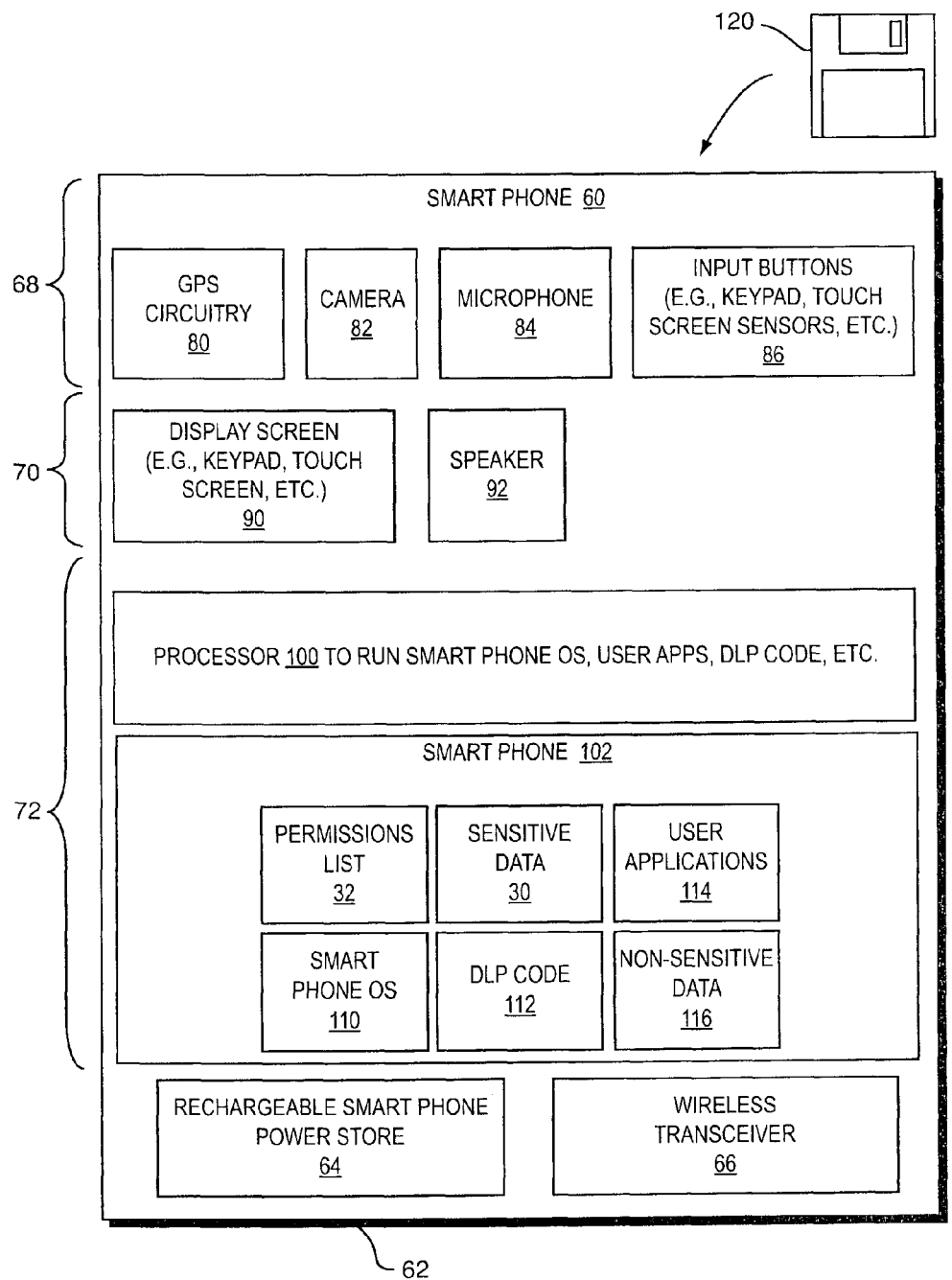
FIG. 2 is diagram illustrating in more detail components that may be used in connection with techniques herein.

FIG. 2 shows a smart phone 60 which is suitable for use as device 14a in FIG. 1. The smart phone 60 includes a smart phone housing 62, a rechargeable smart phone power store 64, a wireless transceiver 66, a set of input components 68, a set of user output components 70, and a smart phone controller 72.

The rechargeable smart phone power store 64 is constructed and arranged to provide power to circuitry within the smart phone 60 over the course of several days while the smart phone 60 remains in a normal operating state to receive and make calls, among other things. The wireless transceiver 66 is constructed and arranged to send wireless communications signals to and receive wireless communications signals from external devices.

The set of input components 68 includes global satellite positioning (GPS) circuitry 80, a camera 82, a microphone 84, and input buttons 86 (e.g., a keypad, touch screen sensors, etc.). The smart phone 60 may include other input components 68 as well such as an external microphone adapter, a hands-free car adapter, a desktop base station adapter, and so on.

The set of user output components 70 includes an electronic display screen 90, and a speaker 92. The smart phone 60 may include other user output components 70 as well such as a wireless earpiece interface, an ear bud interface, an infrared output, a vibration ringer mechanism, and so on.

The smart phone controller 72 includes a processor 100 and memory 102. The memory 102 stores sensitive data 30, permissions list 32, a smart phone operating system 110, DLP code 112, user applications 114 and non-sensitive data 116.

The processor 100 is constructed and arranged to run the smart phone operating system 110, the DLP code 112, and the user applications 114 to enable the user to perform useful work (e.g., perform useful work and/or derive entertainment (e.g., to conduct phone calls, to transact business, to shop online, to play video games, etc.) without transmitting sensitive data 30 in an unauthorized manner.

To deploy the various memory constructs 110 through 114, a computer program product 120 having a non-transitory computer readable storage medium can be used for delivery (e.g., through a physical adapter port of the smart phone 60). Suitable forms for a non transitory computer readable storage medium which delivers executable instructions in a non-volatile manner include CD ROM, disk memory, tape memory, flash memory, and the like. Alternatively, one or more of the memory constructs 110 through 114 may be delivered to the smart phone 60 over the wireless communications medium.

The smart phone housing 62 supports and houses each of the smart phone components 64 through 72 to protect these components against damage. Additionally, the smart phone housing 62 enables the user to conveniently hold and operate the smart phone 60. Preferably, the smart phone housing 62 contains all of the smart phone components 64 through 72 within a convenient hand holdable form factor thus enabling the user to operate the smart phone 60 with relative ease and comfort in a variety of orientations. For example, in a first housing orientation, the user is able to effectively carry out a phone conversation with another caller using the microphone 84 and the speaker 92 properly positioned adjacent the user's head. In other housing orientations, the user is able to effectively position the smart phone 60 to take a picture, to display a video to the user, to play music while the user is walking and carrying the smart phone 60, etc.

During operation, the processor 100 runs the smart phone operating system 110, the DLP code 114 and the user applications 112 which are stored in the smart phone memory 102. The smart phone operating system 110 is constructed and arranged to manage and make available particular resources of the smart phone 60. The user applications 114 are constructed and arranged to enable the user to perform useful work and/or derive entertainment while using the smart phone 60.

The processor 100, when operating in accordance with the DLP code 112, forms logic 15a (FIG. 1). Such an arrangement enables effective deployment as well as provides the ability for easy upgrades. Furthermore, such an arrangement is well suited for provisioning legacy smart phone devices with logic 14a.

As mentioned above, logic 15a can help protects smart phone 60 against unauthorized actions 11 such as unauthorized release of sensitive information 30 by scanning outgoing data, which is ready for transmission, for information satisfying certain criteria such as having a particular personally identifiable information (PII) format. Along these lines, the smart phone 60 can be configured to restrict transmission (or retransmission) of certain types (or classes) of data such as credit card numbers, social security numbers, account numbers, etc. but not others. To this end, logic 15a operates to intercept outgoing user data and possibly block the sensitive information 30 in that data from reaching the wireless transceiver 66 of the smart phone 60.

With respect to codes A, B, a variety of token types can be supported, including time-based tokens, where the token output or token code is a function of a time variable and a token secret (e.g., seed value), challenge-response tokens, where the token output or response is a function of a challenge value provided to the token and a token secret; event-based tokens, where the token output is a function of an event counter and a token secret, or where the token output is a function of the token secret, and the secret is updated in response to some event (e.g., pressing a button on the token), and tokens involving some combination of the above. Device state information may also be incorporated into the process of deriving the token output, as further described in M. Jakobsson and A. Juels, "Identity Authentication System and Methods," U.S. patent application Ser. No. 10/724,034, filed Nov. 26, 2003, which is incorporated herein by reference. Moreover, the one time passwords need not be generated by any particular function; they may be random values stored in the device and shared with server 12. In addition, a PIN may be appended to the token output or otherwise included in the process of computing a one time password. This combination may be done by the device itself, or elsewhere. Alternatively, the PIN may be provided to the device and verified locally by the device before the device produces an output. Biometrics may also be employed to authenticate locally to the device. However, a PIN or a biometric is not required for the techniques described herein.

In at least one implementation, if user 7 is aware that there will be a disconnection from logic 20, one time password information in the form of records can be downloaded by the server to the device, e.g., covering a predetermined amount of time, such as three days. The downloaded records can be stored so as to render it quite difficult for an unauthorized person, such as an individual who has stolen the device (e.g., laptop computer), to access the device.

Codes A, B may be based on use of a hash function, or any of a variety of algorithm types, including one-way algorithms and non one-way algorithms. As used herein, a one-way function refers to a one-way function for which it is substantially more difficult to invert than to compute. A standard hash function such as SHA256 (defined in Federal Information Processing Standard (FIPS) PUB 186-2, "Secure Hash Standard (SHS)", August 2002), may be employed. Alternatively, as is well understood, it may be beneficial to employ an iterated hash construction, e.g., 1000 successive iterations of SHA256, to increase the computational cost to an attacker while maintaining a modest overhead for the user.

In at least some implementations, if logic 20 and/or logic 15a detects some type of irregularity, logic 15a can delay or issue another code A and request a corresponding code B. This places a further burden on the attacker of having to have solved for the next code B as well. It is understood that logic 20 and/or logic 15a can delay and/or request additional security information based upon a variety of factors including time of day, IP address, caller ID information, time of last attempt, first attempt after receiving downloaded records, etc. That is, logic 20 and/or logic 15a can subject an override request to further scrutiny based upon detected irregularity. In addition, logic 20 and/or logic 15a can delay and/or request dialog interaction on a random basis, such as 10 percent of the time.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data loss prevention policies, the method comprising:
   providing a device having data loss prevention (DLP) logic based on policies;
   at the device, detecting an attempt to perform an action that is prohibited by the DLP logic;
   at the device, displaying to a user a first code upon detecting an attempt to perform the action that is prohibited by the DLP logic, wherein the first code is required to obtain a second code that facilitates suspending the policy that prohibited the action;
   submitting the first code to a server in exchange for the second code, wherein the server includes the DLP logic;
   at the server, generating a second code, wherein the second code is generated by the DLP logic;
   at the device, using the second code to enter an override code to allow performance of the action;
   at the device, determining the override code to allow performance of the action; and
   at the device, suspending the policy that prohibited the action in response to the override code being valid, wherein the suspension of the policy allows performance of the action.

2. The method of claim 1, wherein determining an override code further comprises checking a memory location for the override code.

3. The method of claim 1, further comprising:
   at the device, prompting a user to enter an input before an attempt to perform an action prohibited by the DLP logic is performed.

4. The method of claim 1, further comprising:
   at the device, prompting a user to enter an override code after an attempt to perform an action prohibited by the DLP logic is performed.

5. The method of claim 1, further comprising:
   at the device, scanning outgoing data based on policies; and
   determining, based on a type of the outgoing data, whether an action is prohibited by the DLP logic.

6. The method of claim 1, further comprising:
   at the device, prompting the user to enter a justification for performing an action prohibited by the DLP logic.

7. The method of claim 4, further comprising:
   at the device, sending a request to a server for an override code, wherein the server includes the DLP logic; and
   at the device, using the override code received from the server to allow performance of the action.

8. The method of claim 1, wherein the override code includes a one time password.

9. The method of claim 1, wherein the second code expires after the second code is used once at the device.

10. The method of claim 1, wherein the device includes a smart phone.

11. The method of claim 1, wherein the device includes a sensor indicating a location of the device, wherein the override code to allow performance of an action is determined based on the location of the device.

12. The method of claim 1, wherein the device includes a telecommunication device, wherein the telecommunication device communicates with another device to perform an action.

13. A system for use in managing data loss prevention policies, the system comprising:
   first logic providing a device having data loss prevention (DLP) logic based on policies;
   second logic detecting, at the device, an attempt to perform an action that is prohibited by the DLP logic;
   at the device, third logic displaying to a user a first code upon detecting an attempt to perform the action that is prohibited by the DLP logic, wherein the first code is required to obtain a second code that facilitates suspending the policy that prohibited the action:
   fourth logic submitting the first code to a server in exchange for the second code, wherein the server includes the DLP logic;
   at the server, fifth logic generating a second code, wherein the second code is generated by the DLP logic;
   at the device, sixth logic using the second code to enter an override code to allow performance of the action;
   at the device, seventh logic determining the override code to allow performance of the action; and
   at the device, eighth logic suspending the policy that prohibited the action in response to the override code being valid, wherein the suspension of the policy allows performance of the action.

14. The system of claim 13, wherein the override code includes a one time password.

15. The system of claim 13, wherein the device includes a smart phone.

16. The system of claim 13, wherein the device includes a sensor indicating a location of the device, wherein the override code to allow performance of an action is determined based on the location of the device.

17. The system of claim 13, wherein the device includes a telecommunication device, wherein the telecommunication device communicates with another device to perform an action.

18. The system of claim 13, further comprising:
   ninth logic prompting, at the device, a user to enter an input before an attempt to perform an action prohibited by the DLP logic is performed.

19. The system of claim 13, further comprising:
   tenth logic prompting, at the device, a user to enter an override code after an attempt to perform an action prohibited by the DLP logic is performed.

* * * * *